United States Patent
Refai et al.

(10) Patent No.: US 8,487,865 B2
(45) Date of Patent: Jul. 16, 2013

(54) COMPUTER SYSTEM WITH DIGITAL MICROMIRROR DEVICE

(75) Inventors: Hakki H. Refai, Bixby, OK (US); James J. Sluss, Jr., Broken Arrow, OK (US); Mostafa H. Dahshan, Riyadh (SA)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 13/547,956

(22) Filed: Jul. 12, 2012

(65) Prior Publication Data

US 2012/0274557 A1 Nov. 1, 2012

Related U.S. Application Data

(63) Continuation of application No. 12/016,569, filed on Jan. 18, 2008, now abandoned.

(60) Provisional application No. 60/898,008, filed on Jan. 29, 2007.

(51) Int. Cl.
*G09G 3/34* (2006.01)

(52) U.S. Cl.
USPC ............................ 345/108; 345/107; 345/156

(58) Field of Classification Search
USPC .................... 345/87–108, 156–168, 204–215
See application file for complete search history.

(56) References Cited

U.S. PATENT DOCUMENTS

2008/0113774 A1* 5/2008 Denlay ........................... 463/25
2009/0075713 A1* 3/2009 Hartman et al. ................. 463/19

* cited by examiner

*Primary Examiner* — Vijay Shankar
(74) *Attorney, Agent, or Firm* — Dunlap Codding, P.C.

(57) ABSTRACT

Algorithms stored on one or more computer readable medium for interfacing an imaging display with an electronic-ink generating system are described. The algorithms includes instructions for capturing an electronic-ink image, instructions for converting the electronic ink image into control instructions for controlling an electromechanical aspect of the imaging display, and, instructions for providing the control instructions to control circuitry of the imaging display. Interfacing projection systems and methods of interfacing electronic-ink images are also described.

8 Claims, 11 Drawing Sheets

COMPUTER SYSTEM WITH DIGITAL MICROMIRROR DEVICE

CROSS-REFERENCE TO RELATED APPLICATIONS

This application is a continuation of U.S. Ser. No. 12/016,569 Filed Jan. 18, 2008, now abandoned which claims priority to U.S. Provisional Application Ser. No. 60/898,008, filed on Jan. 29, 2007, the entire disclosure of which is hereby incorporated into this disclosure.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

Not applicable.

BACKGROUND OF THE INVENTION

In the late 1920s, television was invented around cathode ray tube technology (CRT), whose use persisted throughout the 20$^{th}$ century. CRTs have almost disappeared in present-day technology, replaced by more innovative flat panel display technologies, such as plasma screens liquid crystal display (LCD), and liquid crystal on silicon (LCOS). Besides significant, recent advances in two-dimensional (2 D) displays, there have been considerable advances toward three-dimensional (3D) displays. The growing demands of 3D displays have stimulated significant research activity over the last several years, resulting in many notable achievements in areas such as stereoscopic, auto stereoscopic, volumetric, and integral imaging displays. Each display type depends on the mechanism being used to display the 3D image data. This in turn requires specific systems designed to fit the 3D image data formats. These systems are composed of software components, optical components, and devices, such as projectors, x-y optical beam scanners, stacks of LCD elements, microlens arrays, screens of various types, and the like.

A projector is a device that can be used to display an image or computer screen on a large projection screen. Several types of projectors are available in the market that are capable of displaying video signals and fixed pictures on projection screens. These projectors can be differentiated from each other according to the projection technology utilized and/or image resolution exhibited. The most recent 3D display mechanisms use high-speed spatial light modulators, such as digital light processors (DLP) or liquid crystal displays (LCD).

DLP is a revolutionary display technology that uses digital micromirror devices (DMD) to digitally control light beams. The DMD demonstrates significant success as a high-speed spatial light modulator in the projectors. In general, an image is created by switching micromirrors of the DMD such that each micromirror represents one pixel in the projected image. The number of micromirrors typically matches the resolution of the projected image. For example, 800×600, 1024×768, 1280×720, 1400×1050 and 1920×1080 matrices are some familiar DMD sizes.

The micromirrors of the DMD can be titled rapidly to reflect light either toward a projection lens or to a heat sink that absorbs light. The rapid steering of the micromirrors, essentially switching between 'on' and 'off') allows the DMD to change the intensity of the light being reflected out toward the projection lens, producing shades of grey in addition to white ('on' position) and black ('oif' position).

Conventional display resolutions for movable projectors, such as the DLP projectors, include super video graphics array (SVGA) 800×600 pixels, extended graphics array (XGA) 1024×768 pixels, SXGA+1400×1050, 720p 1280× 720, and 1080p 1920×1080 pixels. For example, Texas Instruments (TI) Inc. has developed and manufactured a digital light processing board to provide the capability of controlling each individual micromirror from the DMD surface using a special language code, such as Visual C++.

In using a DLP projector, scientists and engineers desire the ability to render their own 2D images, 2D animation, 3D images, or 3D animation. Although these projectors are greatly suited for applications such as home theater entertainment and PowerPoint® presentations, they are not well suited for use in display research and development where precise control of individual micromirrors (or blocks of micromirrors) is desired. In scientific and research arenas, each time the user needs to control any individual micromirror over the DMD surface, the software code must be modified to execute these new changes. This in turn encumbers the user with additional time-consuming steps.

BRIEF SUMMARY OF THE INVENTION

The present invention relates to an interface system capable of converting an electronic-ink image to a two-dimensional and/or three-dimensional representative images and animation for projection on a screen. The developed technology is compatible with electronic-ink-generating systems, such as a standard laptop, desktop computer, a tablet PC, slate-shaped mobile PC, or similar device capable of producing the electronic-ink image. For example, the electronic-ink image may be generated using a touch screen or digitizing tablet technology that allows a user to operate the electronic-ink generating system with a stylus, digital pen, and/or the user's touch. Alternatively, the electronic-ink image may be generated using a keyboard, mouse, and/or pen.

The interface system translates the electronic-ink image on the electronic-ink-generating system to a representative image for projection in an imaging display. The representative image may be an identical copy, vertical mirror copy, horizontal mirror copy, a combination of any of the above listed, or any other suitable image. The imaging display may include DLP, grating light valve, LCD, LCOS, or other suitable imaging displays capable of projecting the representative 2D/3D image and/or 2D/3D animation onto a screen. For example, the imaging display may be a microelectromechanical system (MEMs) that includes a digital micromirror device (DMD) or a grating light valve (GLV). Alternatively, the imaging display may be a LCD or LCOS system.

In one embodiment, the imaging system includes a DMD attached to a DLP board. For example, the imaging system may include the Discovery™ 1100, developed and manufactured by Texas Instruments (Dallas, Tex.), the Discovery™

3000, developed and manufactured, by Texas Instruments (Dallas, Tex.), or any other suitable DLP.

An ALP board may optionally be attached to the DLP board. The ALP board may be one of several developed by ViALUX (Chemnitz, Germany), including the ALP1, ALP2, ALP3, ALP3 High Speed, and the like. For example, the ALP1 may be attached to a DLP such as the Discovery 1100 board. In another embodiment, the ALP3 may be attached to the Discovery 3000 board. Alternatively, an interface board may be developed for use with an individual imaging system based on use and design considerations.

An algorithm stored on one or more computer readable medium is read by a computer and causes the computer to interface the imaging display and control circuitry with the electronic-ink generating system. The algorithm is stored on a computer readable medium and/or on a memory located on the DLP board. For example, the algorithm may be stored on computer readable medium, such as a memory, disk (e.g. magnetic or optical), hardware, and/or firmware. Alternatively, the algorithm can be implemented as software stored in memory, and/or a magnetic or an optical disk. The algorithm can also be stored in firmware such as a field programmable gate array.

The algorithm comprises instructions for 1) capturing electronic ink; 2) converting the electronic ink into control instructions for controlling an electromechanical aspect of an imaging display based light processing array; and, 3) providing the control instructions to the control circuitry of the imaging display.

The algorithm is able to control electromechanical aspects of the imaging display. For example, the pitch of each single micromirror, or blocks of micromirrors that cover a DMD surface, can be controlled using the algorithm.

The algorithm is produced using a language that belongs to one of the following types of languages: machine languages, assembly languages, high-level languages, and/or the like. For example, the algorithm may be produced using high-level languages such as Visual C++, C#, C++, Visual basic, Java, XML, and/or other suitable high-level languages. However, knowledge of Visual C++, C#, C++, Visual based, Java, XML, and/or other high-level languages is not required by a user of the interfacing system.

BRIEF DESCRIPTION OF THE SEVERAL VIEWS OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION OF THE EMBODIMENTS

Figure 1A:
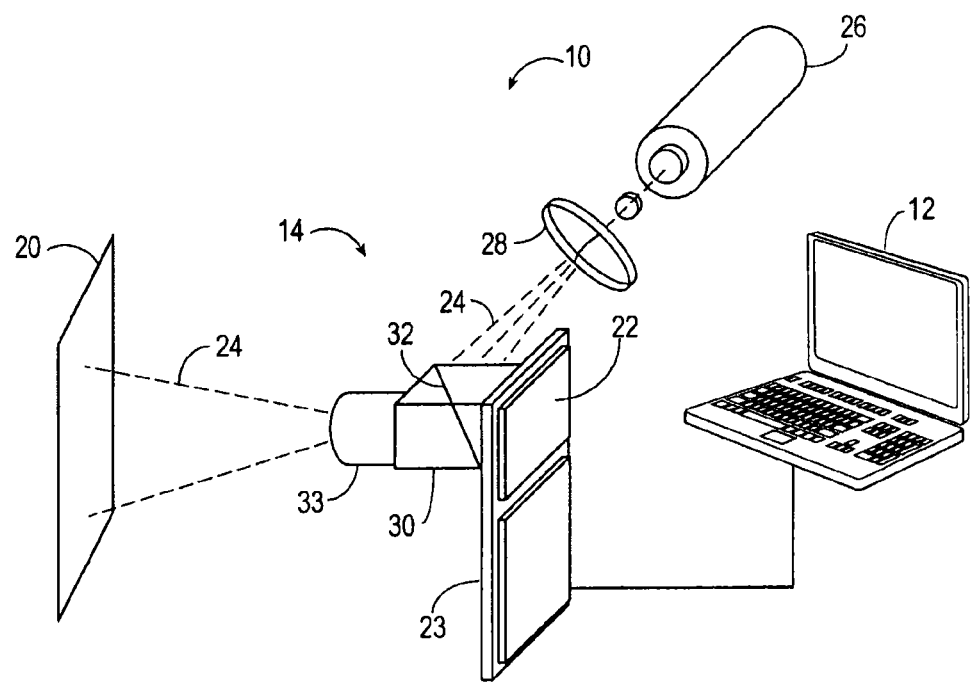
FIG. 1A is a schematic diagram of one embodiment of an interface system for composing electronic-ink images and providing the images to an imaging display for projection of a representative image in accordance with the present invention.

Present embodiments of the invention are shown in the above-identified figures and described in detail below. In describing the embodiments, like or identical reference numerals are used to identify common or similar elements. The figures are not necessarily to scale and certain features in certain views of the figures may be shown exaggerated in scale or in schematic in the interest of clarity and conciseness.

Figure 1B:
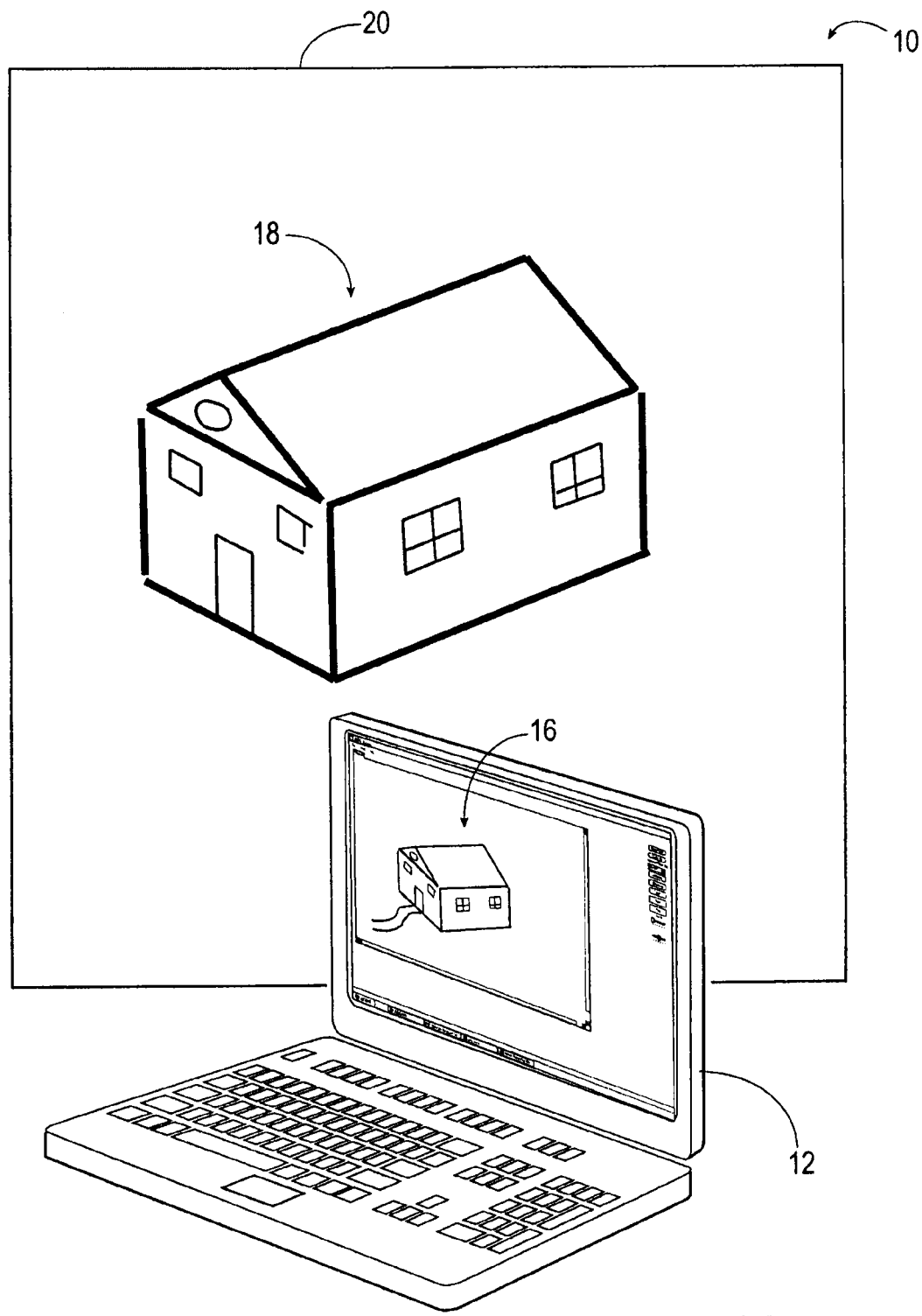
FIG. 1B is a perspective view of an electronic-ink-generating system displaying an electronic-ink image and the corresponding projected representative image.

Referring now to the drawings, and in particular to FIGS. 1A and 1B, shown therein and designated by reference numeral 10 is an interfacing projection system for providing images produced on an electronic-ink-generating system 12 to an imaging display 14. In general, the interface projection system 10 acquires an electronic-ink image 16 from the electronic-ink-generating system 12, and provides control instructions representative of the electronic-ink image 16 to electromechanically control the imaging display 14 and control circuitry of the imaging display to produce a representative image 18. The representative image 18 is a 2D/3D image and/or 2D/3D animation, that is substantially similar to the electronic-ink image 16, and projected onto a screen 20, or other suitable device. Alternatively, the representative image 18 may be used in a non-display application.

The imaging display 14 may be a microelectromechanical system (MEMs) that includes a digital micromirror device (DMD) or a grating light valve (GLV). Alternatively, the imaging display may be a LCD or LCOS system. For simplicity, FIG. 1A illustrates the imaging display 14 using a single projection system. However, multiple projection systems may be used in accordance with the present invention. For example, the imaging display 14 may include three DLPs, wherein each DLP is responsible for projecting single colors of Red, Green, or Blue. A device, such as a prism, may be used to combine the Red, Green, and Blue producing full color images.

In the preferred embodiment, the imaging display 14 includes the use of a DLP. For example, the imaging system 14 may include the Discovery™ 1100, developed and manufactured by Texas Instruments (Dallas, Tex.), the Discovery™ 3000, developed and manufactured, by Texas Instruments (Dallas, Tex.), or any other suitable DLP. The DLP board 23 is attached to the DMD 22. The DMD 22 may be ultra-violet (UV), visible, near-infrared (NIR), or infrared (IR) DMD depending on use and design considerations of the imaging system 14.

An ALP board may optionally be attached to the DLP board 23. The ALP board may be one of several developed by ViALUX (Chemnitz, Germany), including the ALP1, ALP2, ALP3, ALP3 High Speed, and the like. Alternatively, an interface board may be developed for use with an individual imaging system based on use and design considerations.

There are multitude of combinations of DMDs, with or without the use of an ALP attached to the DLP board 23, that provide suitable elements within the imaging display 14 including, but not limited to:

Discovery 1100 including a XGA DMD wherein the DMD may be a Near Infrared DMD, Ultra violet (UV) DMD, or Visible (VIS) DMD;

Discovery 1100 in communication with an ALP board with any type of DMD (e.g. XGA DMD);

Discovery 3000 with any type of DMD (e.g. SXGA+ DMD);

Discovery 3000 in communication with an ALP High Speed board having any type of DMD (e.g. XGA DMD);

Discovery 4000 communicating with an ALP board having any type of DMD (e.g. XGA DMD).

In general, the representative image 18 is created by switching micromirrors of the DMD 22 such that each micromirror represents one pixel in the representative image 18. The number of micromirrors typically matches the resolution of the representative image 18. For example, 800×600, 1024× 768, 1280×720, 1400×1050 and 1920×1080 matrices are some familiar DMD sizes. Thus, the higher the number of micromirrors, the greater the resolution of the representative image 18.

A light source 26 emits at least one light beam 24 through a directing lens 28 and optical module 30 to provide the light beam in the imaging display 14. The light source 26 may include lasers, LEDs, and/or the like. For example, the light source 26 may be a solid-state laser source with an exemplary output wavelength of 543.5 nm and an exemplary output power of up to 100 mW. Other output wavelengths and output power for the light source may also be used. Selection of the light source is based on design considerations and use of the invention.

The directing lens 28 may be any suitable shape and size. For example, the directing lens 28 may be a spherical lens. The light beam 24 passes through the directing lens 28 steering the beam towards an optical module 30. It should be noted, that the user can deliver light to the DMD 22 through any preferred method with the directing lens 28 only being an example of a suitable directing device. For example, the user may alternatively use a fiber bundle cable to deliver light 24 to the DMD 22.

The optical module 30 contains a mirror 32 that reflects the light beam 24 toward to the DMD 22. In the preferred embodiment, the mirror 32 reflects the light beam 24 toward the DMD 22 at a slight angle relative to the normal of the DMD 22 surface. For example, the light beam 24 may be at a 12-20 degree angle relative to the normal of the DMD 22 surface. It should be appreciated by those skilled in the art that this angle will depend on design considerations of the imaging display 14. Micromirrors of the DMD 22 reflect the light back through the optical module 28 towards a projecting lens 33.

The projecting lens 33 may be mounted internally within the optical module 30 or external to the optical module 30. The projecting lens 33 may be any suitable shape and size. In the preferred embodiment, the projecting lens 33 has an aperture size of 3 cm and a focal length of approximately 33 mm. However, other aperture sizes and focal lengths may be used. Selection of the aperture size and focal length is based on design considerations and use of the invention.

Each micromirror within the DMD 22 can be tilted rapidly to reflect light either toward the projection lens 33 or to a heat sink that absorbs the light beam 24. The rapid steering of the micromirrors of the DMD 22 allows the DMD to change the intensity of the light beam 24 being reflected toward the projecting lens 34. Variations in intensity alter the shade of the light beam 24. For example, a micromirror in the "on" position produces a shade of white while a micromirror in the "off" position produces a shade of "black." Varying the intensity of the light beam 24 produces a shade of grey.

The DMD 22 can receive the data relating to the electronic-ink image 16 in a variety of manners, including, but not limited to, parallel, USB, or high-speed serial port connections. The DLP board 23 receives the data from the electronic-ink-generating system 12 and provides this data to DMD 22. The DLP board 23 may optionally have an attached ALP board. In this regard, the ALP is a parallel interface controller board connected with the DLP board 23 to provide high-speed micromirror operation. The electronic-ink image 16 can be pre-loaded to an on-board SDRAM of the ALP and transported to the DMD 22 at high speeds. For examples, the inclusion of an ALP board in communication with the Discovery 3000 provides speeds up to 13300 frames/sec. Alternatively, an interface board may be designed with each individual imaging system 14 to provide for design considerations and use of the interfacing system.

Figure 2A:
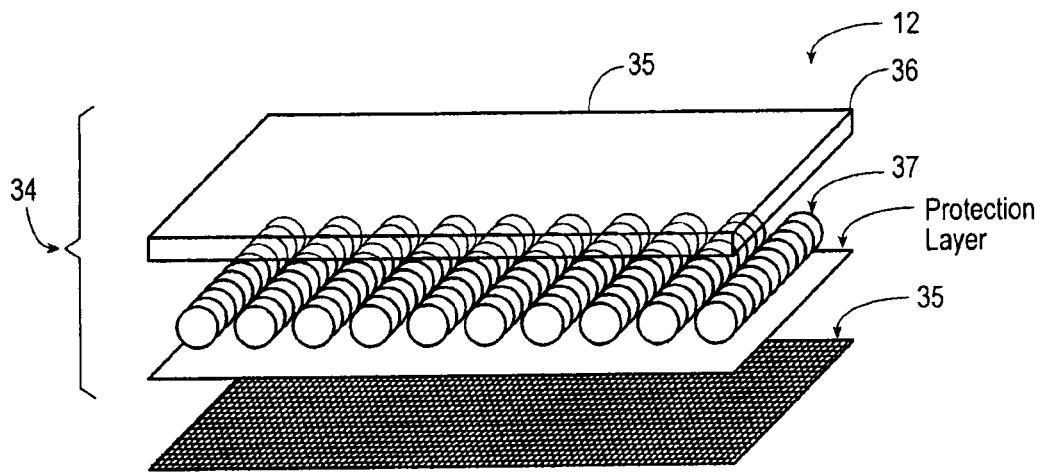
FIG. 2A is a diagrammatic view of one embodiment of an electronic-ink-generating system having a digitizer for composing an electronic-ink image in accordance with the present invention.

Referring now to FIG. 2A, illustrated therein is one embodiment of a portion of the electronic-ink-generating system 12 having an input device 34 capable of producing the electronic-ink image 16 (not shown). In general, the electronic-ink-generating system 12 includes a microprocessor, digital signal processor, or other similar device capable of producing the electronic-ink image 16 through the use of an input device 34. Examples of suitable electronic-ink-generating systems 12 include standard laptops, desktop computers, tablet PCs, slate-shaped mobile PCs, and the like. The input device 34 providing the electronic-ink image 16 is a stylus, digital pen, keyboard, mouse, and/or any other suitable device capable of producing electronic ink.

In the embodiment of the electronic-ink-generating system 12 illustrated in FIG. 2A, the electronic-ink-generating system 12 is a Tablet PC including a microprocessor 35 capable of producing the electronic-ink image 16 (not shown) through the use of the input device 34. In this embodiment, the input device 34 includes a screen 36 sensitive to user interaction. The screen 36 is able to sense a user's touch or stylus interaction through the use of a digitizer 37. For example, the digitizer 36 can be incorporated into the screen 35 of the Tablet PC and provide the relative movements of the user's touch or stylus to the microprocessor 35.

There are two main types of digitizers, passive digitizers and active digitizers. Passive digitizers are typically constructed of resistors and/or capacitors that provide a resolution of approximately 0.25 mm and a sampling rate of approximately 40 samples per second. Using a passive digitizer, the input device 34 may include a stylus as well as a user's finger touch. The second type of digitizer, an active digitizer, produces an electromagnetic field around the screen and calculates the position of the input device 34 using the point at which the input device 34 interacts with this field. For example, the input device 34 may be a stylus having a core magnet surrounded by a coil. Active digitizers provide a high precision and a high sampling rate in the range of 100 samples per second.

Figure 2B:
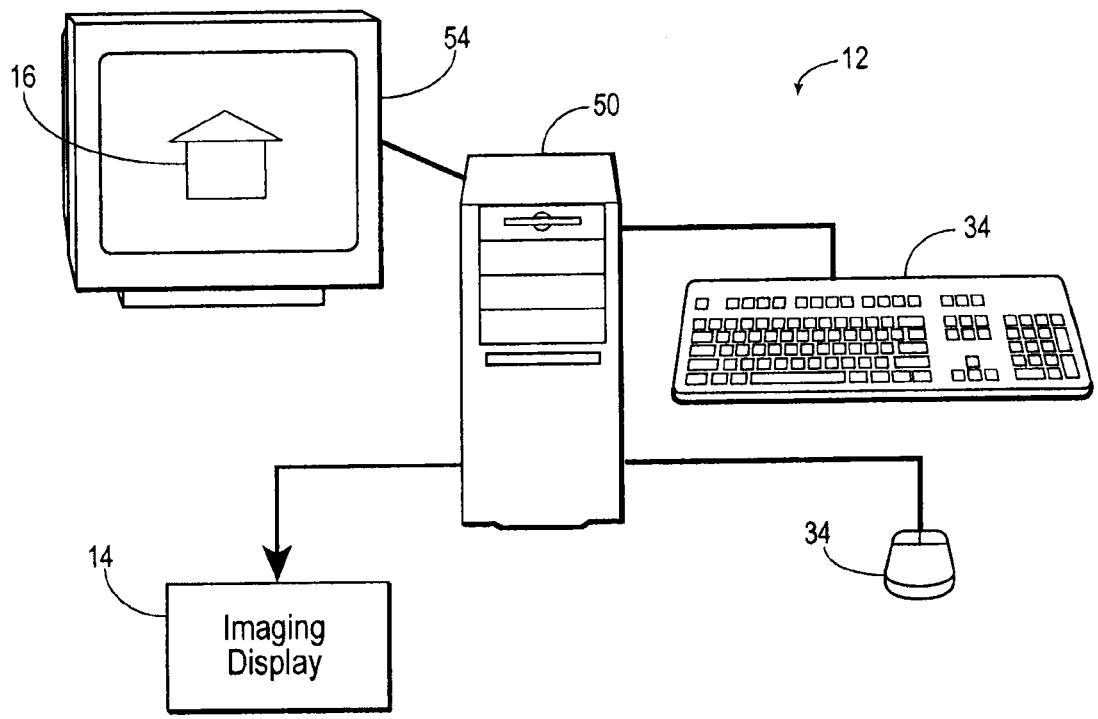
FIG. 2B is a block diagram of another embodiment of an electronic-ink-generating system having a mouse and keyboard for composing an electronic-ink image in accordance with the present invention.

In another embodiment of the interfacing system 10, as illustrated in FIG. 2B, the electronic-ink-generating system 12 includes a computer 50 having a microprocessor or similar device, with a monitor 54, and the input device 34. The input device 34 is any input device capable of rendering the electronic-ink image 16 such as a keyboard, mouse, and/or the like. For example, the input device 34 may be a mouse providing a user point-and-click interaction to compose the electronic-ink image 16.

An algorithm stored on one or more computer readable medium provides interaction to a microprocessor or similar device, such as the computer 50, to interface the imaging display 14 with the electronic-ink generating system 12. In general, the algorithm comprises instructions for 1) capturing electronic ink; 2) converting the electronic ink into control instructions for controlling an electromechanical aspect of the imaging display 14; and, 3) providing the control instructions to the control circuitry of the imaging display 14. Preferably, the algorithm reads all strokes of the input device 34 created by the input device 34 and provides the coordinates to the imaging display 14. The algorithm provides a user the capability of providing the electronic image and being able to display the representative image without having to understand highly complex programming languages such as C++. For example, prior users of DMD Discovery Kits had to undertake significant programming for precision control or undertake tedious and time-consuming routines for simple DMD control requirements. The algorithm provides a user-friendly way to have each every micro-mirror of a DMD Discovery individually addressable and controllable without the need of the user to undertake significant time-consuming programming or hire an expensive programmer.

The algorithm is stored on a computer readable medium, such as a memory, disk (e.g. magnetic or optical), hardware, and/or firmware. For example, the algorithm can be implemented as software stored in memory, and/or a magnetic or an optical disk. Alternatively, the algorithm can be stored in firmware such as a field programmable gate array.

The algorithm is produced using a language that belongs to one of the following types of languages: machine languages, assembly languages, high-level languages, and/or the like. For example, the algorithm may be produced using high-level languages such as Visual C++, C#, C++, Visual basic, Java, XML, and/or other suitable high-level languages. Although the algorithm uses high-level languages, it provides a user of the interfacing system a mechanism to display the representative image without having to know these programming languages.

The algorithm is able to control electromechanical aspects of the imaging display 14. For example, the pitch of each single micromirror, or blocks of micromirrors can be controlled using the algorithm.

Figure 3A:
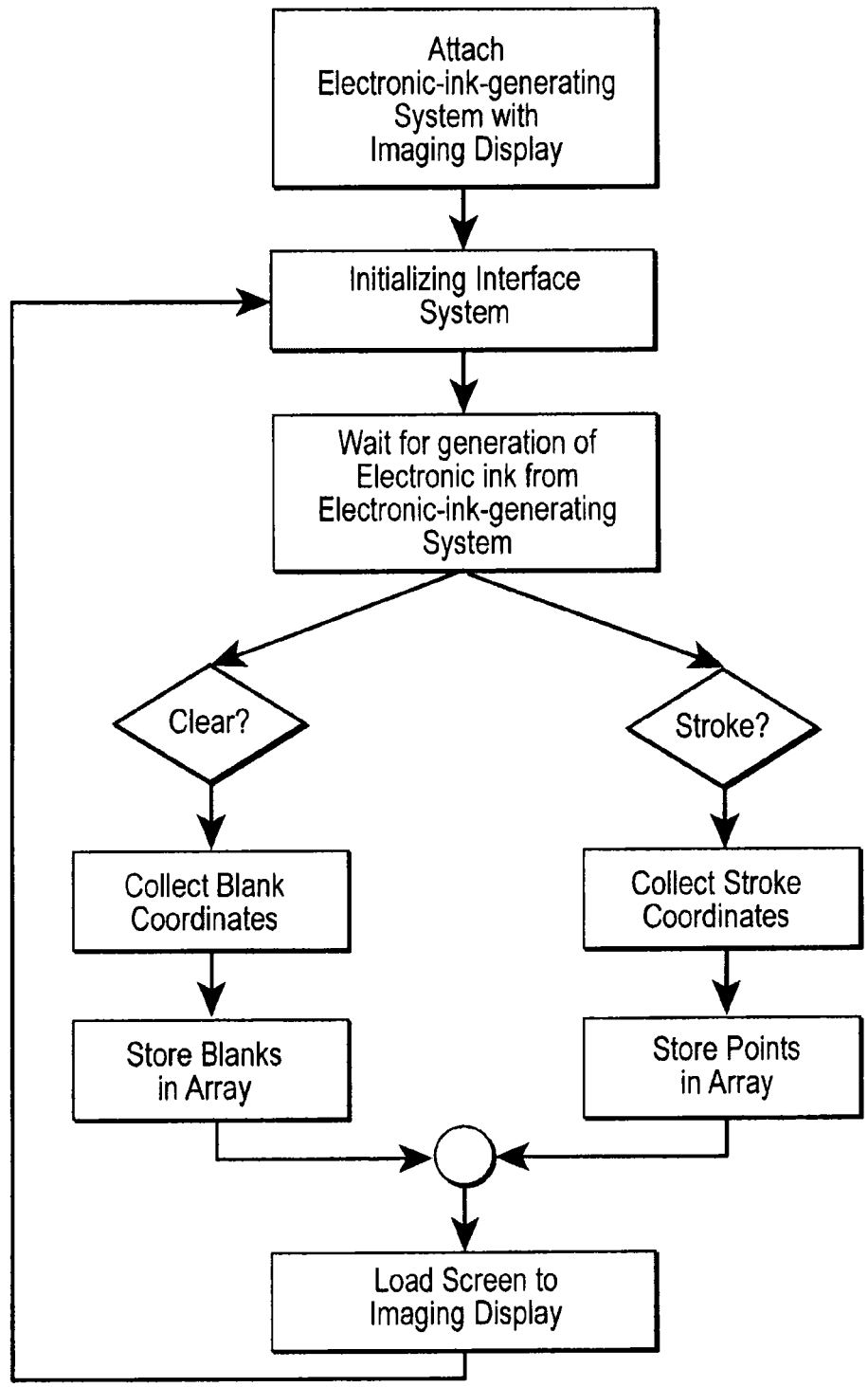
FIG. 3A is a flow chart of an exemplary algorithm for an interfacing system for capturing generated strokes of an electronic-ink image and providing the electronic-ink image to an imaging display.

FIG. 3A illustrates a flow chart of the algorithm for one possible scenario where there are generated strokes and a clear button. In this scenario, the clear button is used to erase all strokes associated with the electronic-ink image 16. After initializing and attaching the electronic-ink-generating system 12 with the imaging display 14, the algorithm waits until electronic ink is generated. For example, electronic ink may be generated through the use of a stylus, mouse, or other similar input device 34. Alternatively, electronic ink may be generated by importing images. For example, JPEG, BMP, or other similar images may be imported into any specified frame.

When electronic ink is generated, the algorithm captures the electronic ink by collecting the coordinates of all the generated points related to that stroke. Each stroke constitutes a pair of (x, y) coordinates within an array of pixels. The coordinates are then stored in an array, which in turn is loaded to the imaging display 14. In the preferred embodiment, the array is loaded to the interface board 23 for display on the DMD 22 surface. The array may be a one-dimensional or multi-dimensional array.

Figure 3B:
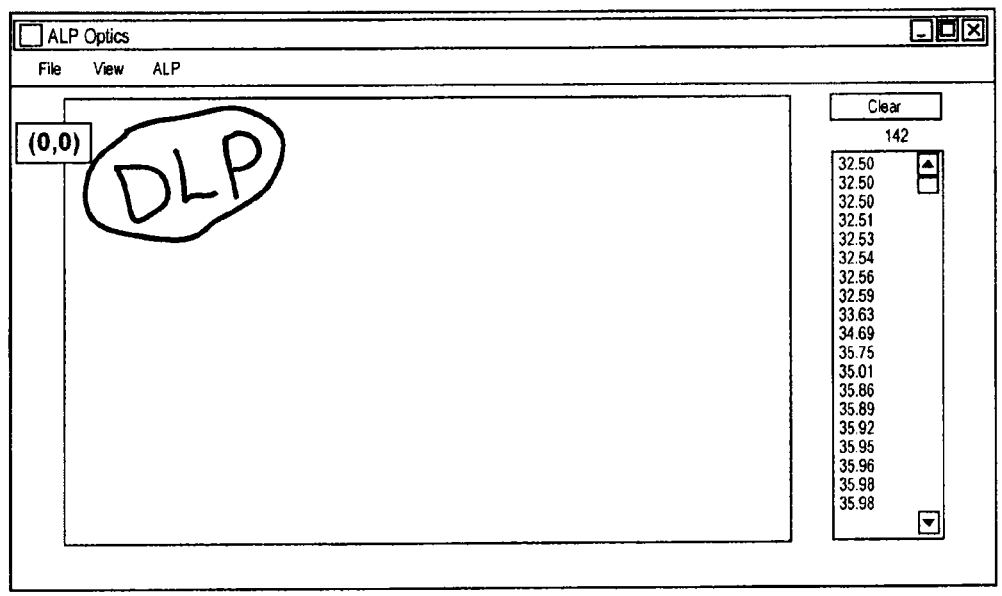
FIG. 3B is a screen shot of frame window associated with the algorithm of FIG. 3A.

When electronic ink is removed, such as when the clear button is clicked, the algorithm erases the point coordinates previously stored in the array. These updated coordinates are loaded as blanks to the imaging display 14. In the preferred embodiment, the coordinates are loaded as blanks to the DLP board 23 or ALP memory and the blanks are displayed in the DMD 22. FIG. 3B illustrates a screenshot of this application where the origin is assigned.

Figure 4:
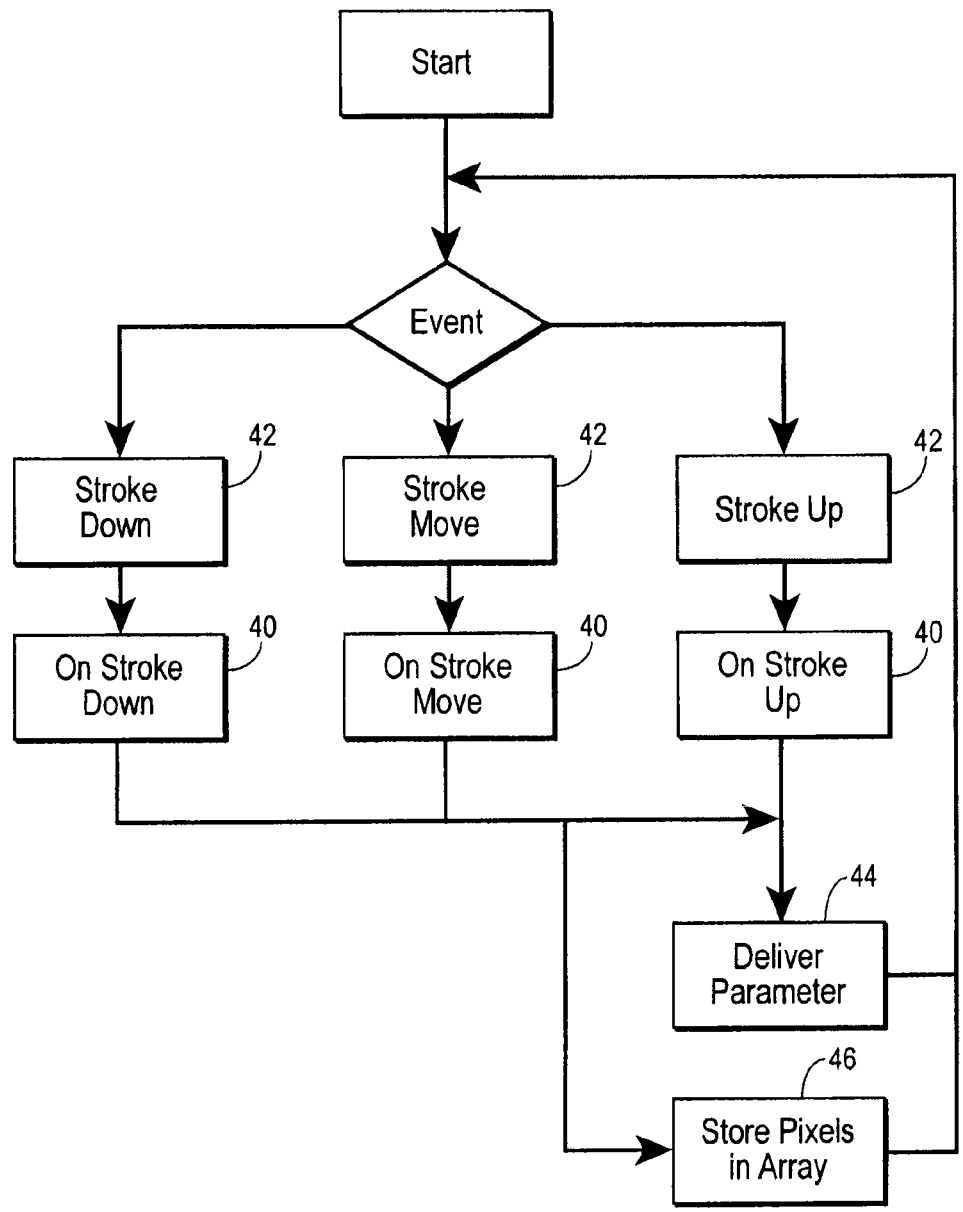
FIG. 4 is a flow chart of another exemplary algorithm for an interfacing system for capturing generated strokes of an electronic-ink image and providing event handlers corresponding to generated strokes.

FIG. 4 illustrates a flow chart of another exemplary algorithm for a possible scenario wherein event handlers 40 are used to provide instructions for capturing the electronic ink provided by the input device 34. In general, the event handler 40 acquires all points that constitute each stroke 42 as pairs of (x, y) coordinates within an array of pixels. In an effort to simply the description of the algorithm, the term stroke will be used. However, other terms associated with the input device 34 are considered, such as mouse, key, touch, and the like.

Each stroke 42 may be associated with a specific event handler 40. For example:

Stroke Down: This event is triggered when the user selects a particular (x, y) coordinate on the application window. When the Stroke Down event occurs, the corresponding event handler OnStrokeDown is called and executed.

Stroke Move: This event is triggered continuously as the user selects several continuous (x, y) coordinates on the application window. For example, a stylus moving over a portion of the screen triggers this event. When the Stroke Move event occurs, the OnStrokeMove event handler is called and executed.

Stroke Up: This event is triggered when the user discontinues selection of (x, y) coordinates on the application window. For example, the event triggers when a stylus is released after being placed down on the screen. Typically, this event occurs only if there was at least one incidence of the Stroke Down event. When the Stroke Up event occurs, the OnStrokeUp event handler is called and executed.

When an event occurs, the corresponding event handler 40 receives and delivers a specified number of internal parameters 44 related to the event. Some of these parameters 44 include, but are not limited to:

Graphics: This parameter provides a pointer to the graphics surface or drawing canvas. Graphics can provide a set of functions for rendering graphics over the screen.

X-Y: This parameter provides the coordinates of the current coordinate location with respect to the top left corner of the current application window, referenced as the origin.

The event handler 40 then transfers and stores the pixels as an array 46 in the electronic-ink-generating system 12 or in the interface board 23. The array 46 may be a one-dimensional or multi-dimensional array. In the preferred embodiment, the array is a one-dimensional array.

Figure 5:
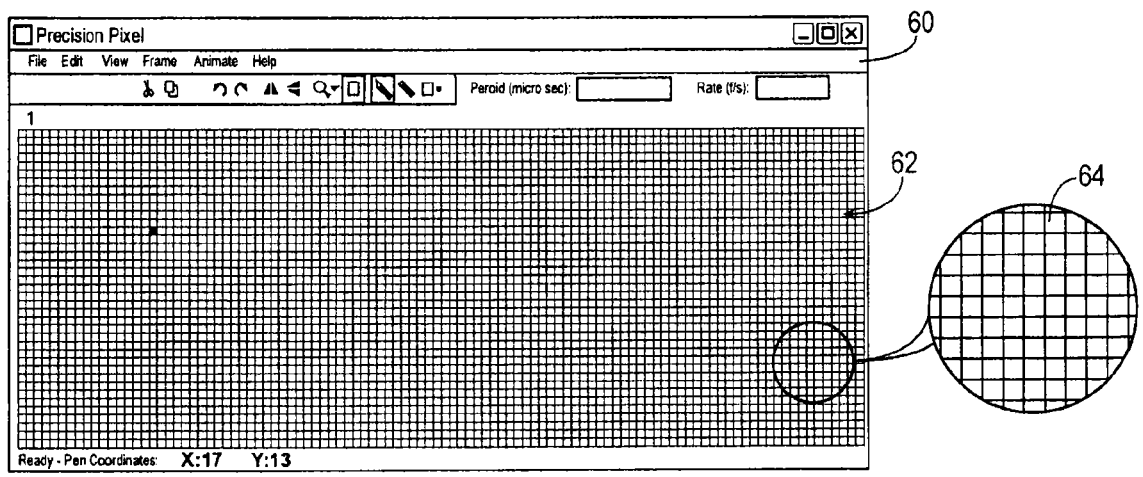
FIG. 5 is a screen shot of a frame window provided to a user in facilitating acquisition of the user's stroke to provide an electronic-ink image in accordance with the present invention

Referring now to FIG. 5, in one embodiment of the algorithm, a frame window 60 or similar screen is provided to the user to facilitate the acquisition of the user's stroke. The frame window 60 provides a model of a DMD array, with the mirrors in the DMD represented by a grid 62 of rectangular elements 64. The dimensions of this grid correspond to the dimensions of the DMD 22 (not shown) in the imaging display 14. For example, the grid may correspond to a DMD having 1024×768 dimensions. Although the grid of FIG. 5 is formed of rectangular elements 64, as one skilled in the art will appreciate, the rectangular elements 64 may be any shape such as a circle, square, triangle, or any fanciful shape in accordance with the present invention. Additionally, the lines forming the grid need not appear in the frame window 60 but may be hidden from the user.

To activate a particular mirror in the DMD 22, a user will select a rectangular element 64 corresponding to that mirror. For example, in FIG. 5, the activation of coordinates x=17 and y=13, activates a mirror of the DMD 22 at coordinates X=17, Y=13.

In the preferred embodiment, the algorithm provides for binary frames, such that selection of the particular rectangular element 64 provides for turning the corresponding mirror ON or OFF for a given frame window 60. In another embodiment, the algorithm, in addition to turning the corresponding mirrors ON or OFF provides means of modulating the state of the given mirror over a select duration of time. For example, such modulation may occur through the use of an animation sequence.

Figure 6A:
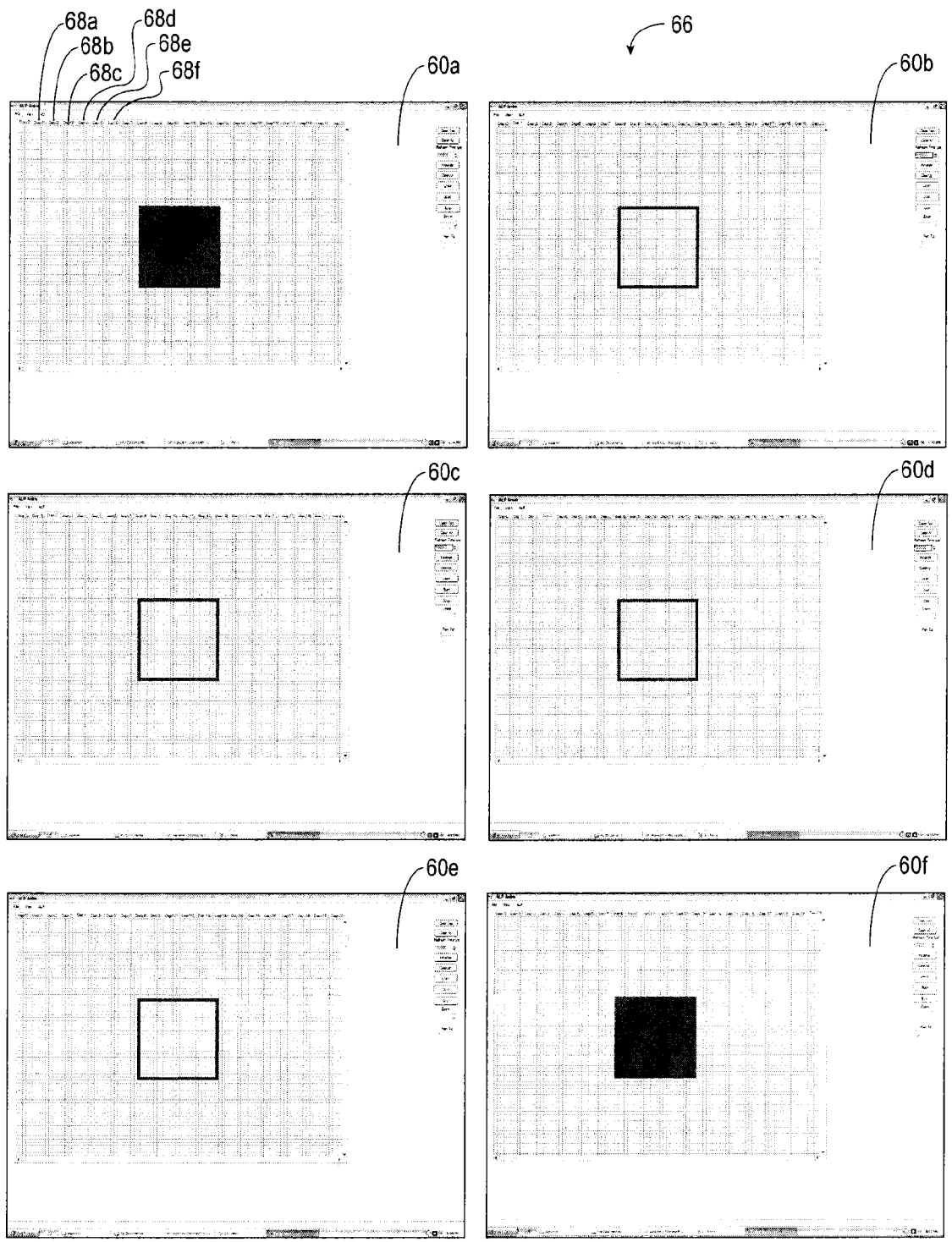
FIG. 6A is a plurality of screen shots forming an exemplary animation sequence in accordance with the present invention.

Animation enables a user to design not only a single frame window 60 for display, but a sequence of frame windows as well. FIG. 6 illustrates a sequence of frame windows 60a-60f providing for an animation sequence 66 in accordance with the present invention. Each frame window 60a-f for the animation sequence 66 is designed within a separate tab 68a-f. The pixels belonging to a given frame window 60a-f are contained within the tab 68a-f exclusively designed for that frame window. A user may activate or deactivate each pixel in the particular frame window 60a-f separately from the pixels belonging to other frame windows 60a-f in the animation sequence 66. For example, a user may activate a pixel with coordinates of (100, 200) and (101, 200) in frame window 60a and deactivate pixel (101, 200) in frame window 60b.

In the preferred embodiment, the frame windows 60a-60f are sequentially numbered according their position in the animation sequence 66. The animation sequence 66 may be looped or manually initiated and/or stopped For example, each animation sequence 66 may be a looped sequence such that all frame windows 60a-f are displayed starting with the first and ending with the last, and then repeated until manually stopped. In a looped animation sequence, the algorithm will provide for manual or automatic selection of a preferable frame period. In the preferred embodiment, the frame period is denoted in microsecond.

The frame rate controls how quickly the animation sequence 66 is displayed. A faster frame rate will cause the each frame window 60a-f to be displayed more quickly. The algorithm provides the means for manual or automatic selection of a preferable frame rate. In the preferred embodiment, the frame rate is denoted in frames per second.

Figure 6B:
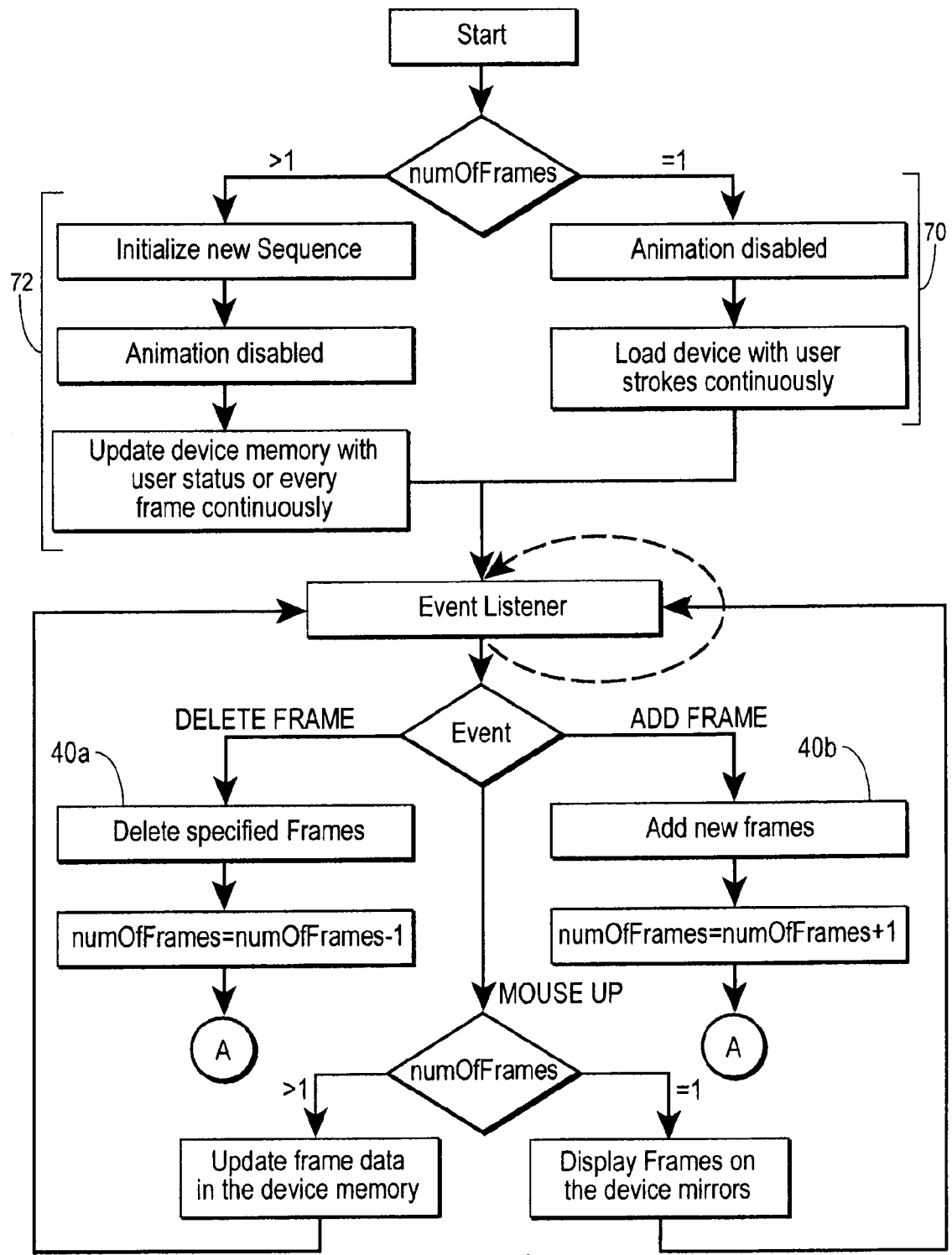
FIG. 6B is a flow chart of another exemplary algorithm for an interfacing system for providing event handlers corresponding to a user's actions.

FIG. 6B illustrates a flow chart of another exemplary algorithm for a possible scenario wherein event handlers 40 are used to provide instructions for animation based on a user's action. In general, the interface projection system 10 is able to work in two different modes: 1) one frame display mode 70; or 2) animation mode 72. The event handlers 40a and 40b determine whether to add or delete frames. The user's selection to either add or delete frames can determine which mode is initiated. For example, if there is only one frame, the interface projection system 10 follows the one frame display mode 70. If there is >1 frame, the interface projection system 10 follows the animation mode 72.

In the one frame display mode 70, a particular frame data pixel is displayed directly by the imaging display 14. In this regard, the interfacing projection system 10 memory may be updated with the user's strokes continuously.

In the animation mode 72, a sequence of frames are uploaded into the memory of the interfacing projection system 10. In this regard, the interfacing projection system 10 memory may be updated with the user strokes on every frame/page continuously. The sequence of frames may be uploaded frame by frame, or in the entirety. Frames may be numbered sequentially from 1 to a maximum number related to the device maximum capacity. The frame number may be used to reference the frame in its order of display in the animation mode 72.

Figure 7:
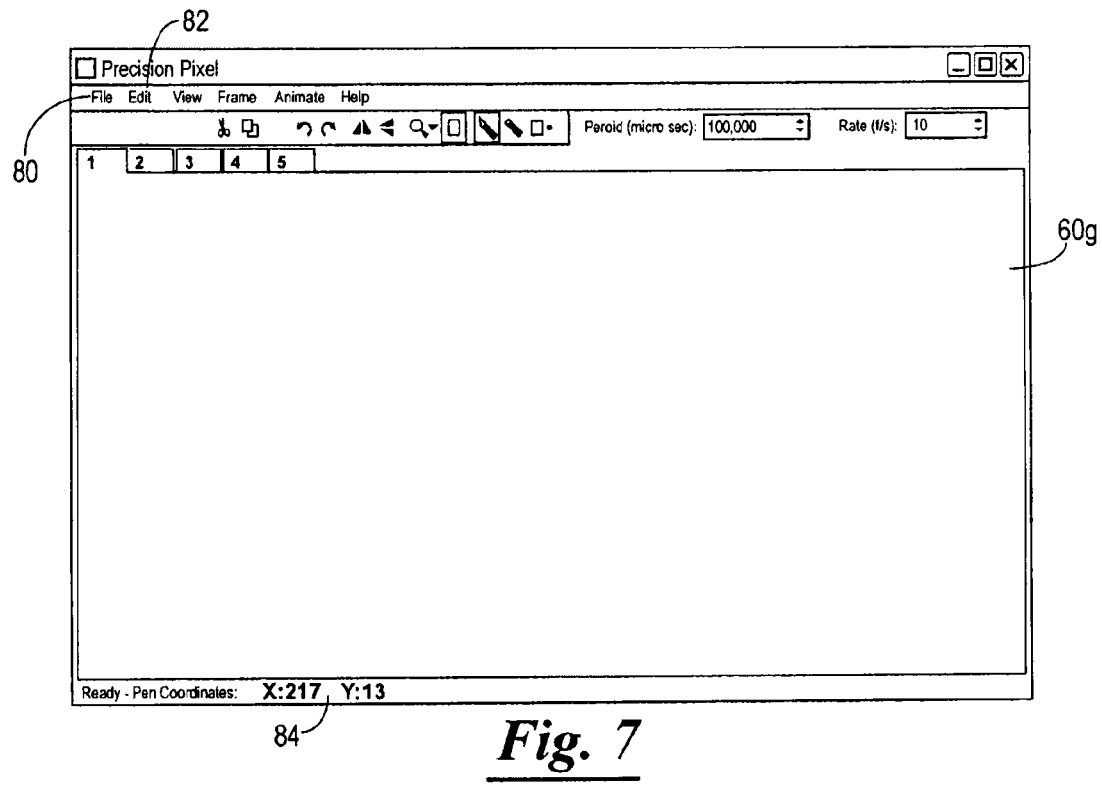
FIG. 7 is a screen shot of an exemplary frame window for capturing an electronic-ink image for projection in an imaging display in accordance with the present invention.

Referring now to FIG. 7, the algorithm provides for familiar basic operatives found in drawing programs such as FILE 80 and EDIT 82 options. These options contain well-known functions such as New, Open, and Save, along with Cut, Copy, and Paste. Additionally, other common basic operative are contemplated for use in the program such as a shape selector, pen selector, color selector, zoom function, and/or any other similar basic operative known within the art.

In addition to the basic operatives found in drawing programs, the algorithm provides a status bar 84 located within the frame window 60g as illustrated in FIG. 7. The status bar 84 provides status information to the user regarding the coordinates of the input device that is active on the grid. In addition, the status bar 84 may provide information regarding the display status of the animation sequence.

Figure 8:
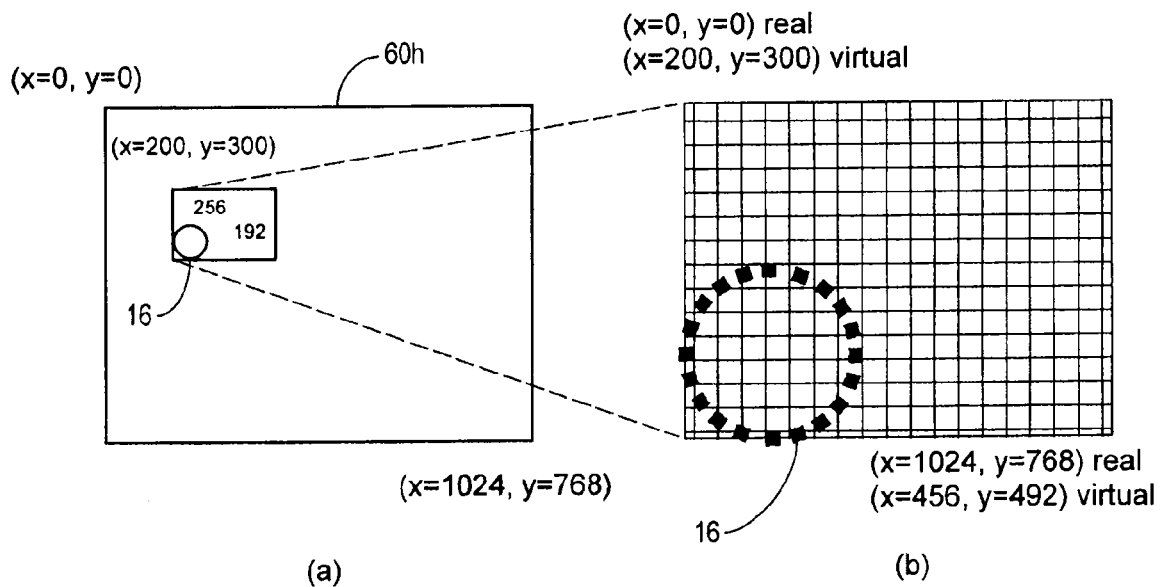
FIG. 8 is a diagrammatic representation of a coordinate translation of a zoomed electronic-ink image.

The algorithm also provides for different scales as part of a ZOOM and SCROLL function as illustrated in FIG. 8. When the frame window 60h is being drawn with a different scale (ZOOM action) and/or moved to different coordinates (SCROLL action), the coordinates passed from the event handler no longer represent the actual coordinates that need to be stored. To get the correct coordinates, the algorithm translates the electronic ink image 16 coordinates by taking into consideration the current zoom factor and the current scroll position.

In another embodiment, the algorithm can optionally provide for a trigger system providing synchronization between the imaging display 14 and one or more external devices. External devices may be color wheels, light sources, one or more slave DLP projection systems, or the like. For example, the trigger system may include the imaging display 14 and a slave DLP projection system with two types of trigger signals: Trigger Input and Trigger Output. A user adds the Trigger Output signal to at least one frame or multiple frames to be provided by the imaging display 14. The Trigger Input signal is assigned to at least one frame or multiple frames to be provided by the slave DLP projection system. Once activated, the imaging display 14 projects the frame associated with the Trigger Output signal and sends an electrical pulse toward a specified pin at the slave DLP projection system. The electrical pulse activates the slave DLP projection system to immediately project the frame associated with the Trigger Input signal. This provides synchronization between the imaging display 14 and the slave DLP projection system.

The following examples of the interface projection system 10 are set forth hereinafter. It is to be understood that the examples are for illustrative purposes only and are not to be construed as limiting the scope of the invention as described

EXAMPLE 1

Figure 9:
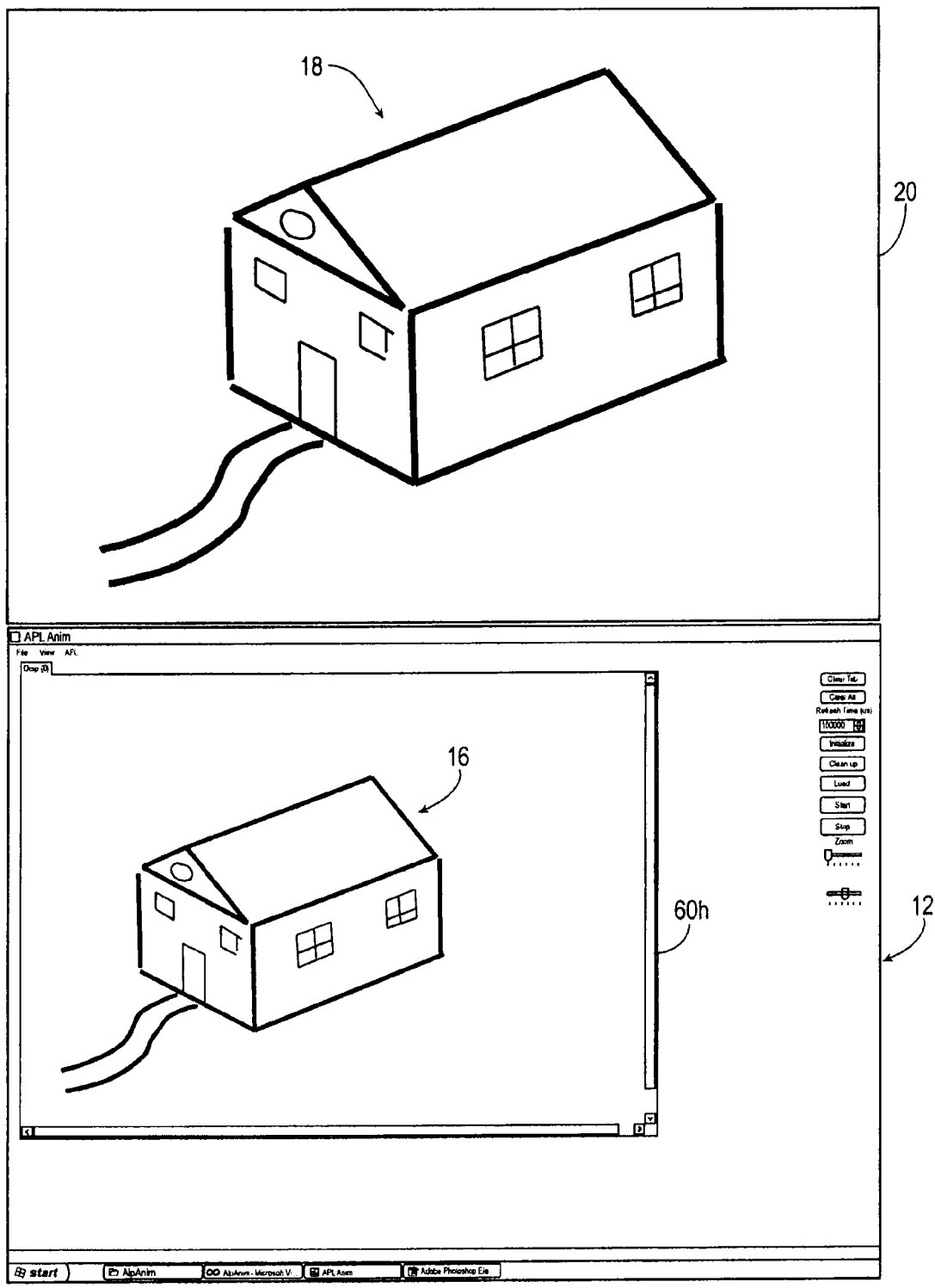
FIG. 9 is a screen shot of an exemplary electronic image and a photograph of a corresponding representative image acquired in accordance with the present invention.

FIG. 9 illustrates an example of the representative image 18 that results from the electronic ink image 16 produced on the electronic-ink generating system 12. In this example, a house is drawn on the electronic-ink generating system 12 and the resulting representative image 18 of the house is shown projected from the imaging display 14 (not shown). The algorithm acquires all of the strokes from the electronic-ink-generating system 12 and then supplies their coordinates to the DLP and/or ALP boards that render over the DMD micromirror array of the imaging display 14. In turn, the imaging display 14 projects light onto the screen 20 to render the representative image 18. The algorithm provides a single updated two-dimensional image that can be projected onto a two-dimensional projection screen. The algorithm continuously checks for any new added strokes over the frame window 60h. Any new or added stroke is subsequently added to the representative image 18. The algorithm provides the user with the capability of zooming and scrolling the frame window 60h and achieving a level of control down to each individual micromirror in the imaging display.

EXAMPLE 2

In another example, the algorithm provides the user the ability to render a three-dimensional volumetric image by drawing the slices of the three-dimensional image over a previously specified number of frame windows. Using a looping function, the algorithm can provide continuous projection of the slices forming the three-dimensional image with complete control over the projection speed. In the preferred embodiment, the algorithm provides control over the projection speed up to 6900 frames/sec. The slices can be projected at any chosen projection speed according to the utilized volumetric three-dimensional based translational screen. For example, the animation sequence of FIG. 6 when provided as slices forms a three-dimensional image of a cube whose side equals the length of approximately twenty-five micromirrors.

The foregoing disclosure includes the best mode for practicing the invention. It is apparent, however, that those skilled in the relevant art will recognize variations of the invention that are not described herein. While the invention is defined by the appended claims, the invention is not limited to the literal meaning of the claims, but also includes these variations.

What is claimed is:

1. A computer comprising:
   a screen;
   an input device: and
   a microprocessor executing an algorithm to cause the microprocessor to:
   provide a frame window onto the screen, the frame window providing a model of a microelectromechanical system array having a plurality of elements;
   capture a user's selection of elements of the model from the input device;
   form an image on the screen of the computer based upon the user's selection of elements;
   converting the image into control instructions for controlling electromechanical aspects of an imaging display; and,
   provide the control instructions to control circuitry of the imaging display to cause the image displayed on the screen of the computer to be displayed by the imaging display.

2. The computer of claim 1, wherein each of the elements in the model corresponds to a micromechanical element of a microelectromechanical system of a predetermined imaging display.

3. An algorithm stored on one or more computer readable medium for interfacing an imaging display with a computer, comprising:
   instructions for providing a frame window onto a screen of a computer, the frame window providing a model of a microelectromechanical system array having a plurality of elements,
   instructions for capturing user selection of elements of the model to form an image displayed on the screen of the computer;
   instructions for converting the image into control instructions for controlling electromechanical aspects of the imaging display; and,
   instructions for providing the control instructions to control circuitry of the imaging display to cause the image displayed on the screen of the computer to be displayed by the imaging display.

4. The algorithm of claim 3, wherein the imaging display is a microelectromechanical imaging system.

5. The algorithm of claim 4, wherein the microelectromechanical imaging system includes a digital micromirror device having micromirrors, wherein the instructions provided to the control circuitry control the pitch of the micromirrors.

6. The algorithm of claim 5, wherein the elements of the model of the microelectromechanical system array are rectangular elements, each rectangular element corresponding to a digital micromirror of the digital micromirror device.

7. The algorithm of claim 4, wherein the imaging display includes a grating light valve and wherein the instructions provided to the control circuitry controls the grating light valve.

8. The algorithm of claim 3, wherein the imaging display includes liquid crystal on silicon (LCOS) display, and wherein the instruction provided to the control circuitry control the LCOS display.

* * * * *